(12) United States Patent
Krutzfeldt (10) Patent No.: US 10,994,683 B2
(45) Date of Patent: May 4, 2021

(54) PAYLOAD PERIMETER PROTECTING BUMPER

(71) Applicant: Douglas D Krutzfeldt, Solon, IA (US)

(72) Inventor: Garry Burnell Krutzfeldt, Keystone, IA (US)

(73) Assignee: Douglas D. Krutzfeldt, Solon, IA (US)

( * ) Notice: Subject to any disclaimer, the term of this patent is extended or adjusted under 35 U.S.C. 154(b) by 0 days.

(21) Appl. No.: 16/412,639

(22) Filed: May 15, 2019

(65) Prior Publication Data
US 2019/0351856 A1 Nov. 21, 2019

Related U.S. Application Data (60) Provisional application No. 62/671,512, filed on May 15, 2018.

(51) Int. Cl.
*B60R 19/38* (2006.01)
*B60R 19/40* (2006.01)
*B62D 33/03* (2006.01)

(52) U.S. Cl.
CPC .............. *B60R 19/40* (2013.01); *B62D 33/03* (2013.01)

(58) Field of Classification Search
CPC ................................. B60R 19/24; B60R 19/38
USPC ................................................... 293/24, 118
See application file for complete search history.

(56) References Cited

U.S. PATENT DOCUMENTS

| 4,360,228 | A | * | 11/1982 | Rasmussen | B60R 19/38 |
| | | | | | 292/205 |
| 5,570,826 | A | * | 11/1996 | Garbes | B60R 9/06 |
| | | | | | 224/518 |
| 5,775,560 | A | * | 7/1998 | Zahn | B60R 9/06 |
| | | | | | 224/485 |
| 6,129,371 | A | * | 10/2000 | Powell | B60R 9/06 |
| | | | | | 224/502 |
| 6,364,337 | B1 | * | 4/2002 | Rowland | B60D 1/155 |
| | | | | | 280/479.2 |
| 9,511,735 | B2 | * | 12/2016 | Schlup, Jr. | B60R 21/131 |
| 9,663,039 | B2 | * | 5/2017 | Marmon | B60D 1/58 |
| 2003/0184100 | A1 | * | 10/2003 | Turner | B60R 19/12 |
| | | | | | 293/155 |
| 2008/0240897 | A1 | * | 10/2008 | Miro | B60R 9/06 |
| | | | | | 414/462 |
| 2019/0193661 | A1 | * | 6/2019 | Minoura | B60R 19/38 |

* cited by examiner

*Primary Examiner* — Jason S Morrow
*Assistant Examiner* — Kevin P Weldon
(74) *Attorney, Agent, or Firm* — Simmons Perrine Moyer Bergman PLC (57) ABSTRACT

A payload perimeter protecting bumper and method of stopping an approaching vehicle from coming too close to a parked vehicle which includes a male receiver insert structure, which is configured to be inserted into and coupled to a hitch receiver on a truck, an intermediate portion disposed between male receiver insert structure and bumper member, which provides for the pivoting ability. The bumper member has an elongated pivotable structural member. The system is configured so that if you were to be trapped, you could unlock the pivot limiting pin and pivot upward the elongated pivotable structural member, thereby creating more space to move to exit the parking spot. In some embodiments, the elongated pivotable structural member could have a remote controlled linear actuator, with a length that could be automated.

2 Claims, 7 Drawing Sheets

PAYLOAD PERIMETER PROTECTING BUMPER

CROSS REFERENCE TO RELATED APPLICATIONS

This application claims the benefit of the provisional patent application with the same name and inventor, having Ser. No. 62/671,512, which was filed on May 15, 2018, which application is incorporated herein in its entirety by this reference.

BACKGROUND OF THE INVENTION

In the past, farmers often use pickup trucks to haul pallets of seed or other agricultural products.

These pallets are often loaded into the payload area of the pickup trucks by using fork lifts. Normally, the tailgate is folded down when the forklift moves the pallets into the truck.

While this practice has been used frequently for many years, it does have some drawbacks. Often the front end of the forklift will run into the tailgate causing damage which can render the tailgate unusable.

Consequently, there exists a need for new systems and methods for loading a pickup truck with a forklift without damaging the tailgate.

SUMMARY OF THE INVENTION

The present invention includes a bumper configured to protect a tailgate of a pickup truck. One general aspect includes a payload perimeter protecting bumper 100 including: a male receiver insert structure 110; a bumper member 120 which includes: a contact portion 124, an elongated pivotable structural member 122, and a plurality of intra-gap spanning sleeves coupled to opposing sides of elongated pivotable structural member 122; and an intermediate portion 130; disposed between male receiver insert structure 110 and bumper member 120 and configured with a first side rear aperture 136, a first side bottom aperture 134, and a first side front aperture 132 so as to permit bumper member 120 to pivot from a vertically oriented configuration to a horizontally oriented configuration.

One general aspect includes a method for protecting a tailgate of a pickup truck during a process of loading pallets into a box of the pickup truck using a forklift, the method including the steps of: providing a male receiver insert structure; providing a bumper member which includes: a contact portion, an elongated pivotable structural member, and a plurality of intra-gap spanning sleeves coupled to opposing sides of elongated pivotable structural member; providing an intermediate portion; disposed between said male receiver insert structure and bumper member and configured with a first side rear aperture, a first side bottom aperture, and a first side front aperture so as to permit bumper member to pivot from a vertically oriented configuration to a horizontally oriented configuration. The method also includes inserting the male receiver insert structure into a hitch receiver of a pickup truck while its tailgate is up. The method also includes inserting a retention pin 112 to securely attach the male receiver insert structure to the pickup truck. The method also includes removing a pivot limiting pin from a non-pivot axis intra-gap spanning sleeve, which is located at first side rear aperture. The method also includes lowering the bumper member until the bumper member is horizontal. The method also includes inserting a pivot limiting pin through first side bottom aperture, non-pivot axis intra-gap spanning sleeve and then through a second side bottom aperture which is across the gap from first side bottom aperture. The method also includes lowering a pickup tailgate to allow open axis to a payload area from a rear portion of the pickup truck. The method also includes driving a forklift up to and contacting a contact portion. The method also includes lowering a pallet down into the pickup truck without contacting the tailgate with the front of the forklift.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to tailgates of pickup trucks, such a payload perimeter protecting system and method for loading pallets into pickup trucks could be implemented in many different types of vehicles with different types of structures surrounding the payload area.

In an embodiment, the system and method of the present invention described herein can be viewed as examples of many potential variations of the present invention which are protected hereunder.

Figure 1:
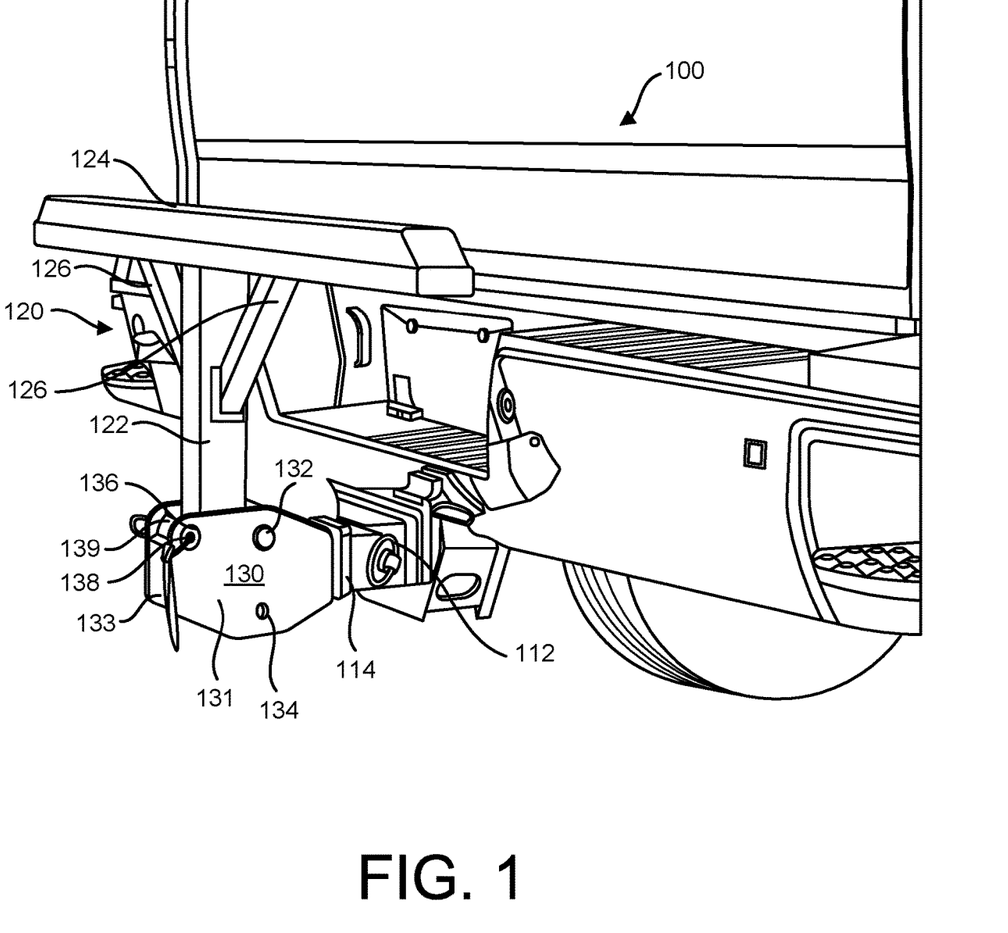
FIG. 1 is a perspective view of the present invention shown in a stowed configuration and installed in a hitch receiver of a pickup truck having a tailgate.
Figure 7:
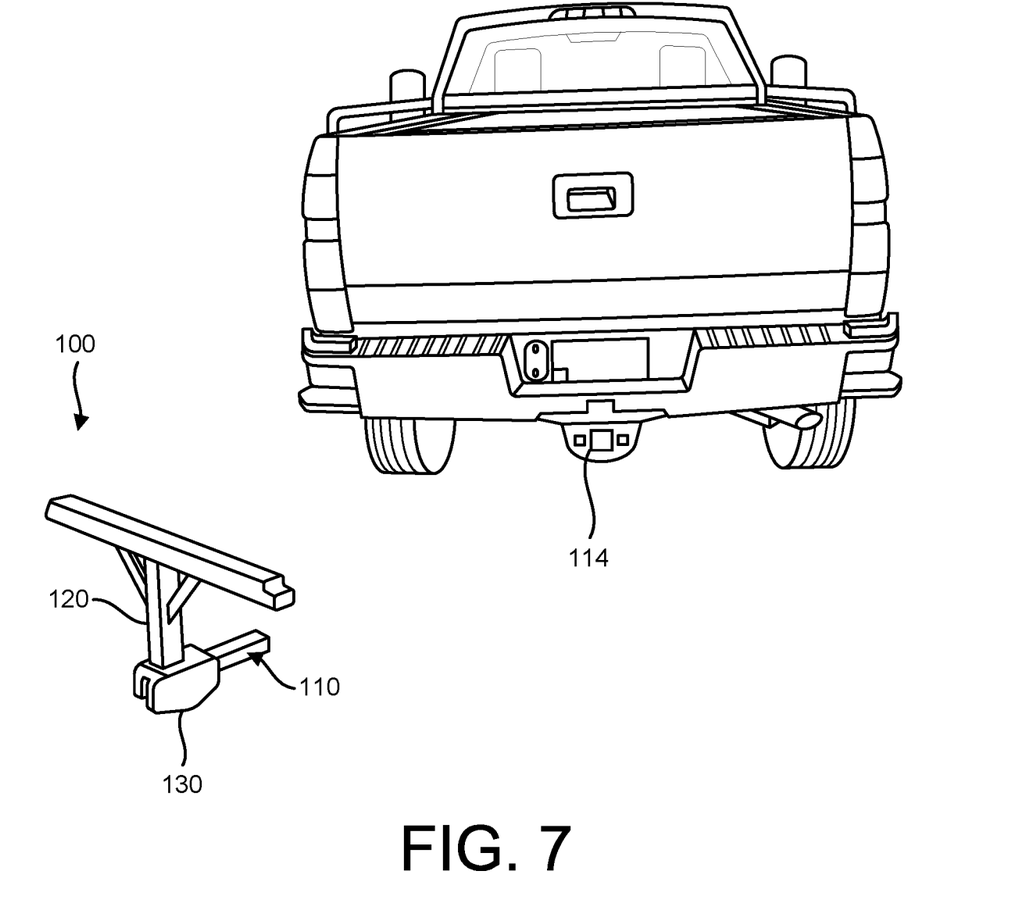
FIG. 7 is a perspective view of the present invention before insertion into the hitch receiver of the truck.

Now collectively referring to the drawings, wherein like numerals refer to like matter throughout and, more particularly, FIGS. 1 and 7, which show the present invention in a stowed configuration, adjacent to and disposed in a hitch receiver 114 of a pickup truck. The inventive payload perimeter protecting bumper 100 includes a male receiver insert structure 110 (FIG. 7), which is configured to be inserted into a hitch receiver 114 on a pickup truck. The dimensions of male receiver insert structure 110 can be made to industry standards which includes, in one common configuration, an outside dimension of two inches, which is configured to be inserted into a standard hitch receiver with an inside dimension of 2.5 inches. Male receiver insert structure 110 can be a steel tube with four flat sides and rounded corners, which is substantially square (a perimeter with cumulatively more flat than curved portions). Male receiver insert structure 110 may also be solid and/or may have other suitable shapes as well. Of course, there would need to be at least one hole through the male receiver insert structure 110, for insertion therein of the insert retention pin 112, for the purpose of coupling the payload perimeter protecting bumper 100 to the vehicle. Many variations of ways to couple the payload perimeter protecting bumper 100 to a vehicle are possible and the present invention intends to include any such attachment method.

Intermediate portion 130 is disposed between male receiver insert structure 110 and bumper member 120 and provides for the pivoting ability. Intermediate portion 130 includes first side 131 and second side 133, which may be parallel steel plates each welded to an internal receiver 111, which may be a substantially square tube sized and configured to receive and retain therein an end of male receiver insert structure 110, which is opposite a free end 113, which is configured for insertion into a hitch receiver 114 on a truck. These connections between the male receiver insert structure 110, the internal receiver 111, and first side 131 and second side 133 are preferably strong and rigid and done with welding or suitable substitute means.

Bumper member 120 has an internal end 123 and a contact portion 124 with an elongated pivotable structural member 122 therebetween, along with two diagonal stabilizers 126. Also attached near, but not at the internal end 123 of elongated pivotable structural member 122, are non-pivot axis intra-gap spanning sleeve 139 and pivot axis intra-gap spanning sleeve 632, each of which are sized and configured to substantially span the gap between first side 131 and second side 133 and to receive therethrough a pin or bolt. When internal end 123 of bumper member 120 is inserted into intermediate portion 130, pivot axis intra-gap spanning sleeve 632 is made to align with first side front aperture 132 and second side front aperture 432 and a bolt is inserted through first side front aperture 132, second side front aperture 432 and a nut is tightened enough to secure bumper member 120 into intermediate portion 130 while still allowing pivoting around the pivoting axis between first side front aperture 132 and second side front aperture 432. Non-pivot axis intra-gap spanning sleeve 139 is permitted to pivot (when no pin is disposed therethrough) from a stowed position at first side rear aperture 136 (FIG. 1, with pivot limiting pin 138 therein), and to first side bottom aperture 134 (FIG. 2, without any pin therein) when the payload perimeter protecting bumper 100 is in a deployed configuration.

Figure 2:
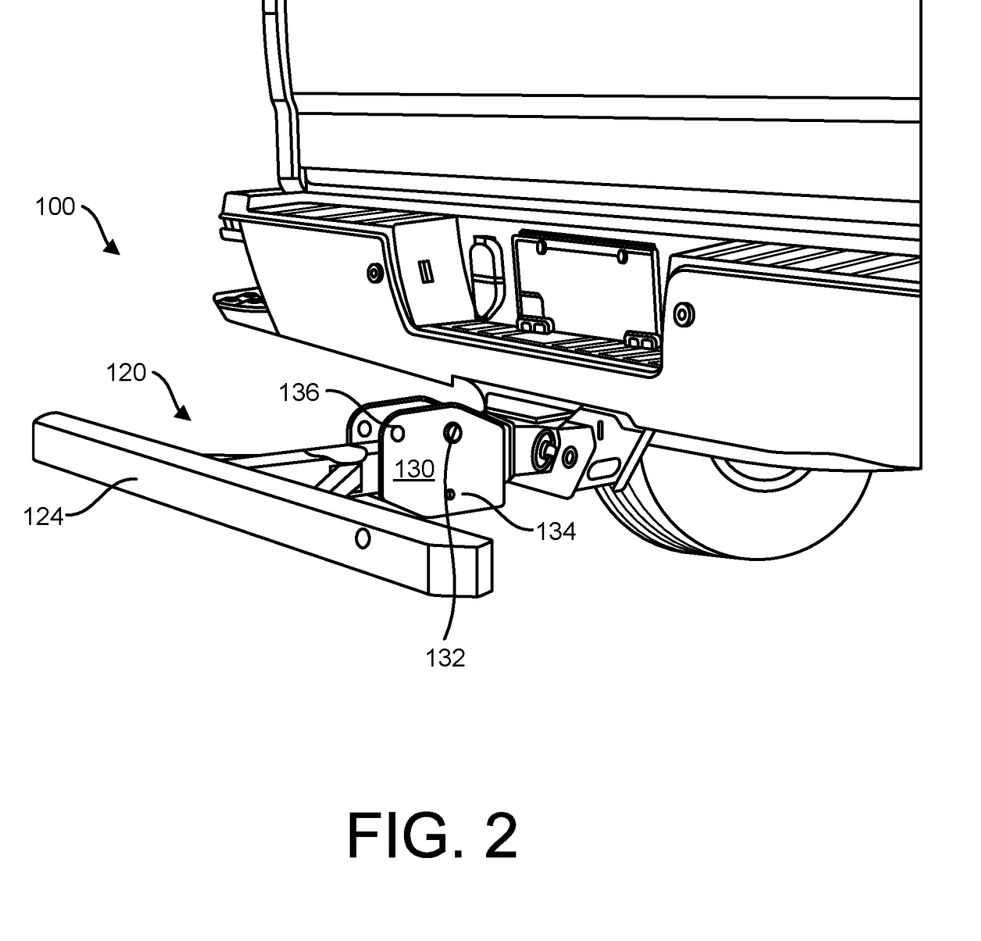
FIG. 2 is a perspective view of the system of FIG. 1 after being pivoted to a deployed position.

Now referring to FIG. 2, which is a perspective view of the system of FIG. 1 after bumper member 120 has been pivoted downward to a deployed position. This is accomplished by removing the pivot limiting pin 138 from non-pivot axis intra-gap spanning sleeve 139 and then pivoting bumper member 120 downward until non-pivot axis intra-gap spanning sleeve 139 is in registration with first side bottom aperture 134 so that a pin could be placed through first side bottom aperture 134.

Figure 3:
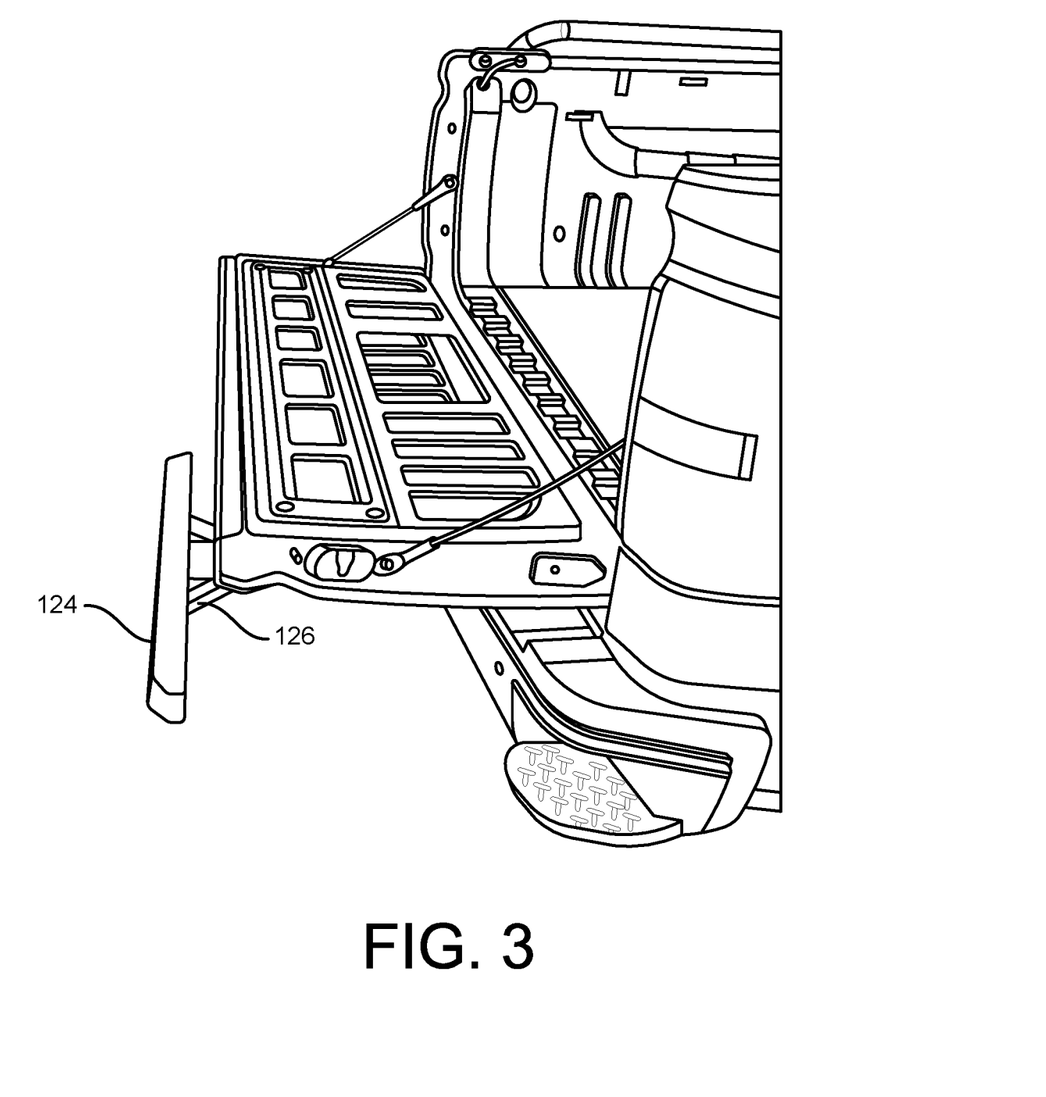
FIG. 3 is a view of the system of FIG. 2 from an elevated perspective, with the tailgate of the truck having been lowered.
Figure 4:
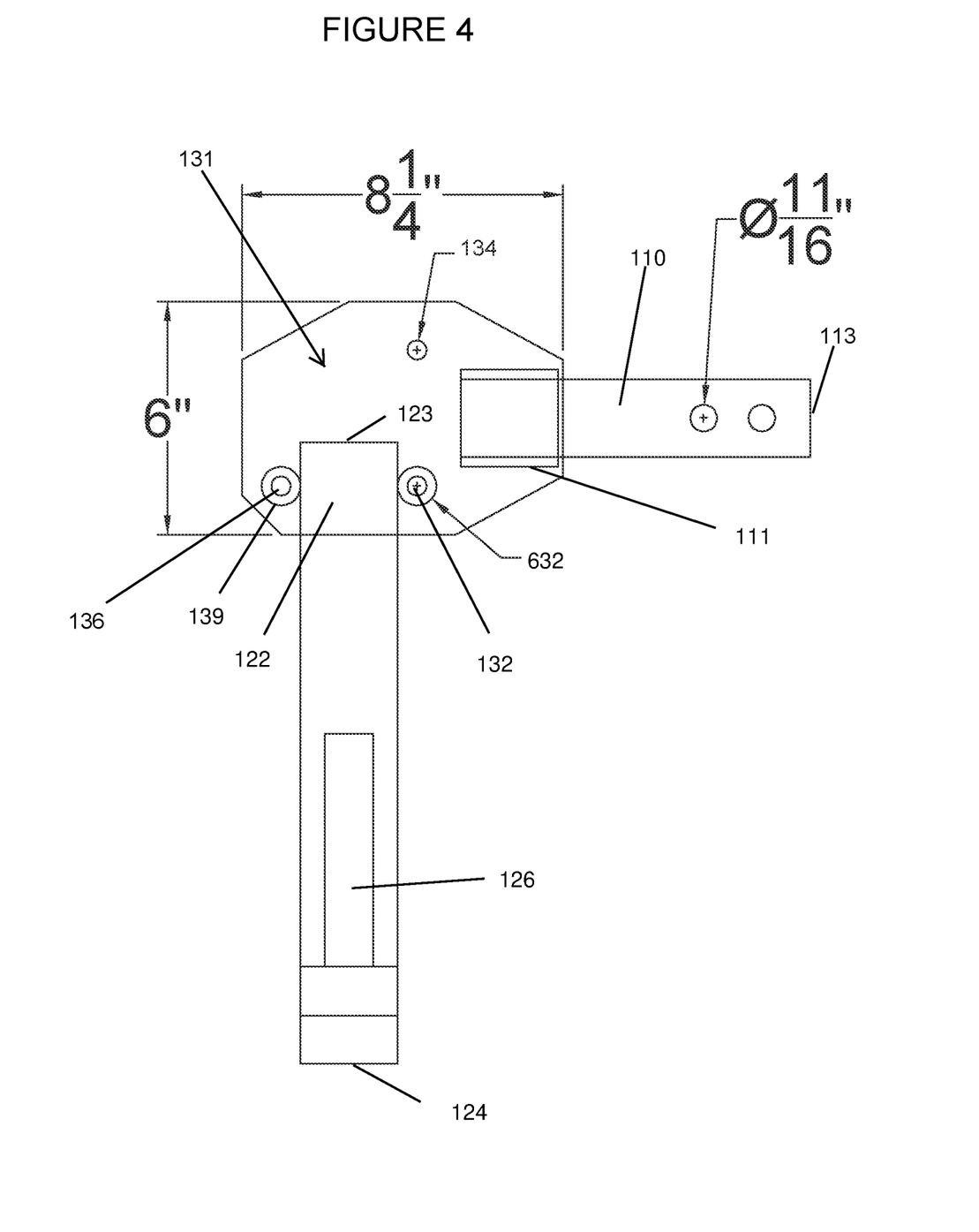
FIG. 4 is sectional view of the system configuration of FIG. 1 which shows the present invention as if it had been cut along a plane parallel to and between first side 131 and second side 133.
Figure 5:
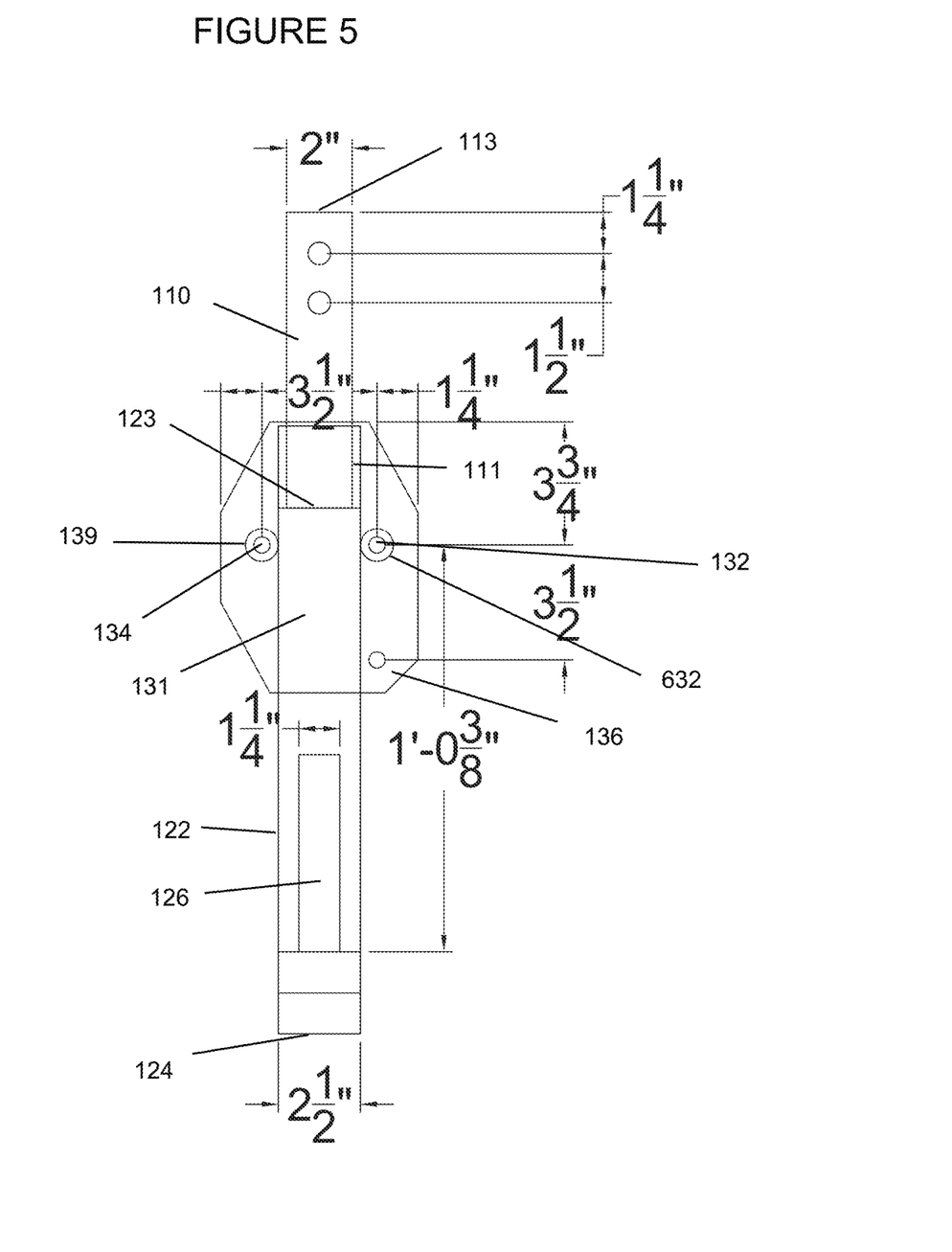
FIG. 5 is sectional view of the system configuration of FIG. 2 which shows the present invention as if it had been cut along a plane parallel to and between first side 131 and second side 133.
Figure 6:
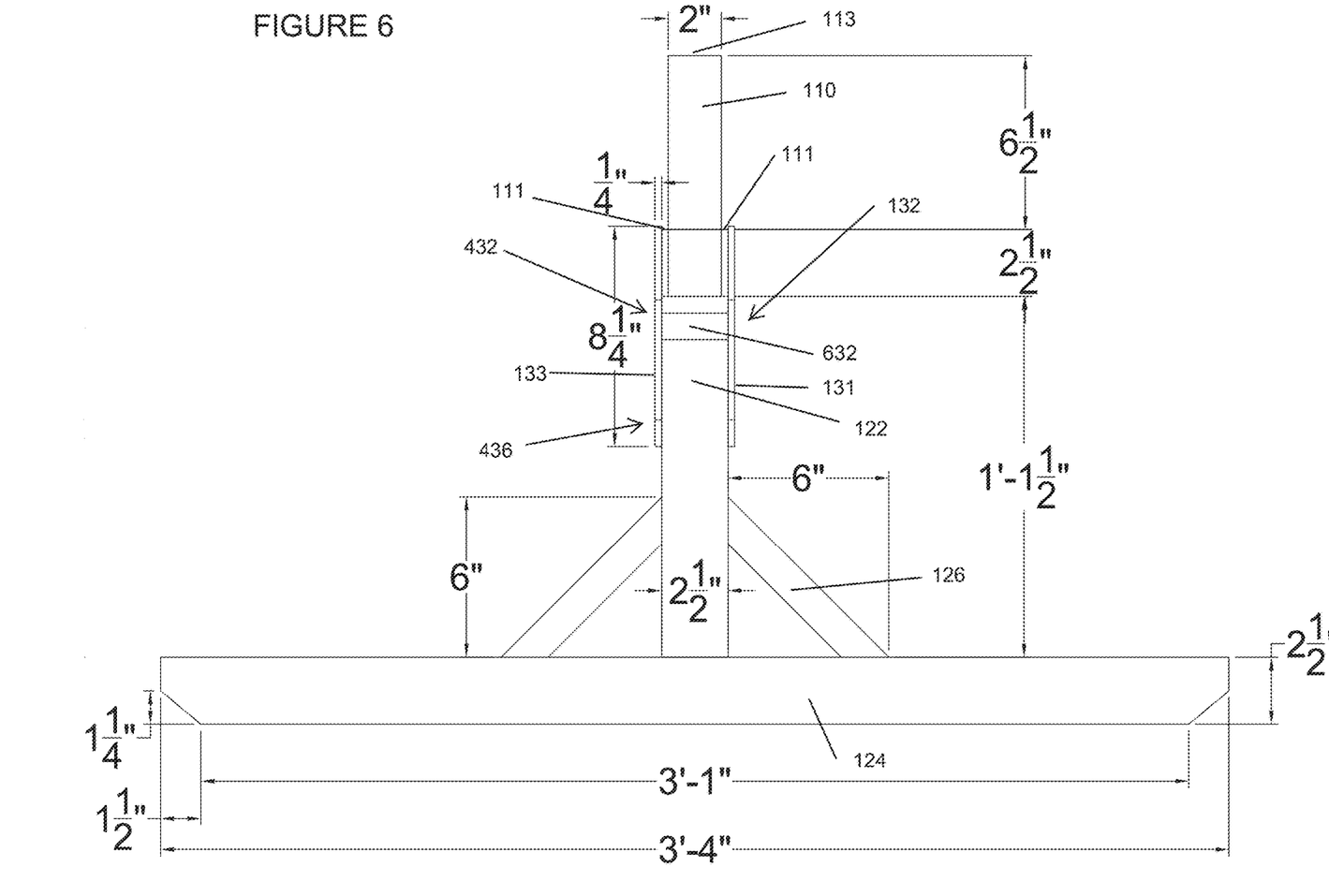
FIG. 6 is a top view of the system configuration of FIG. 2.

Now referring to FIG. 3, which is a view of the system of FIG. 2 from an elevated perspective, with the tailgate of the truck having been lowered. The lowering is done to allow a fork lift carrying a pallet of heavy material to place it in the bed of the pickup truck. When this is done, the forklift needs to come close to the back of the truck to permit full insertion of the load into the truck, but not contact the tailgate to avoid damage. With the aid of the present invention, the forklift can drive up until the front of the forklift contacts the payload perimeter protecting bumper 100. This prevents the forklift from getting too close to the tailgate of the truck and thereby protects the tailgate from being damaged. More details of the payload perimeter protecting bumper 100 can be obtained by referring to FIGS. 4-6.

The entire method of the present invention is as follows:

1) the payload perimeter protecting bumper 100 is inserted into the hitch receiver 114 of the truck while the tailgate is up. Receiver to insert retention pin 112 is inserted to securely attach the payload perimeter protecting bumper 100 to the truck.

2) Pivot limiting pin 138 is removed from non-pivot axis intra-gap spanning sleeve 139, which is located at first side rear aperture 136, and it is lowered down away from the truck until the bumper member 120 is horizontal.

3) Pivot limiting pin 138 is inserted through first side bottom aperture 134, non-pivot axis intra-gap spanning sleeve 139 and then through a second side bottom aperture which is across the gap from first side bottom aperture 134.

4) The pickup tailgate is lowered to allow open axis to the payload area from the rear of the truck.

5) A forklift is driven up to and contacts contact portion 124 and the pallet is lowered down into the truck without contacting the tailgate with the front of the forklift.

The precise implementation of the present invention will vary depending upon the particular application.

The exact device of the present invention can be used for a completely different purpose.

Another aspect of the present invention is to use this device to prevent a vehicle from being trapped in a parallel parking spot by having a vehicle parking too closely so that a vehicle is effectively trapped. As more and more vehicle are being equipped with parking assist systems and cameras, some people are parking vehicles in even tighter parking spots. For example, if you were to park in a spot with open parking spots both in front of you and behind you, you could get effectively trapped if both of those spots were later filled by cars parking nearly touching both of your vehicle's bumpers. The present invention would use key or combination locking pins, which are well-known in the prior art, to secure the payload perimeter protecting bumper 100 into the hitch receiver 114 and to prevent the elongated pivotable structural member 122 from pivoting upward out of its horizontal configuration. If you were to be trapped, you could unlock the pivot limiting pin 138 and pivot upward the elongated pivotable structural member 122, thereby creating more space to move to exit the parking spot. In some embodiments, the elongated pivotable structural member 122 could have a remote controlled linear actuator, e.g. a hydraulically controlled length adjustable member to make the process completely operable from inside the cab of the protected vehicle. Of course, these remote controls of the length could be automated so that it is made as short as possible during the act of parking and the length is automatically expanded to allow enough room to exit after retraction of the linear actuator. The amount of space needed could be calculated on-board depending upon the length and width of the vehicle, its wheel base and the details of the vehicles steering mechanisms.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A method for protecting a tailgate of a pickup truck during a process of loading pallets into a box of the pickup truck using a forklift, the method comprising the steps of:
   providing a male receiver insert structure;
   providing a bumper member which comprises:
      a contact portion;
      an elongated pivotable structural member;
      a plurality of intra-gap spanning sleeves coupled to opposing sides of the elongated pivotable structural member;
   providing an intermediate portion, disposed between said male receiver insert structure and the bumper member and configured with a first side rear aperture, a first side bottom aperture, and a first side front aperture so as to permit the bumper member to pivot from a vertically oriented configuration to a horizontally oriented configuration;
   a) inserting the male receiver insert structure into a hitch receiver of a pickup truck while its tailgate is up;
   b) inserting a retention pin to securely attach the male receiver insert structure to the pickup truck;
   c) removing a pivot limiting pin from a non-pivot axis intra-gap spanning sleeve, which is located at first side rear aperture;
   d) lowering the bumper member until the bumper member is horizontal;
   e) inserting the pivot limiting pin through the first side bottom aperture, non-pivot axis intra-gap spanning sleeve and then through a second side bottom aperture which is across a gap from the first side bottom aperture;
   f) lowering a pickup tailgate to allow open axis to a payload area from a rear portion of the pickup truck;
   g) driving a forklift up to and contacting a contact portion; and
   h) lowering a pallet down into the pickup truck without contacting the tailgate with the front of the forklift.

2. A method for stopping an approaching forklift from coming too close to a first vehicle, the method comprising the steps of:
   providing a male receiver insert structure;
   providing a bumper member which comprises:
      a contact portion;
      an elongated pivotable structural member;
      a plurality of intra-gap spanning sleeves coupled to opposing sides of the elongated pivotable structural member;
   providing an intermediate portion, disposed between said male receiver insert structure and the bumper member and configured with a first side rear aperture, a first side bottom aperture, and a first side front aperture so as to permit the bumper member to pivot from a vertically oriented configuration to a horizontally oriented configuration;
   inserting the male receiver insert structure into a hitch receiver of a first vehicle;
   inserting a retention pin to securely attach the male receiver insert structure to the first vehicle;
   parking the first vehicle at first location;
   removing a pivot limiting pin from a non-pivot axis intra-gap spanning sleeve, which is located at the first side rear aperture;
   lowering the bumper member until the bumper member is horizontal;
   inserting pivot limiting pin through first side bottom aperture, non-pivot axis intra-gap spanning sleeve and then through a second side bottom aperture which is across a gap from the first side bottom aperture;
   lowering a pickup tailgate to allow open axis to a payload area from a rear portion of the first vehicle;
   driving a forklift up to and contacting a contact portion; and
   lowering a pallet down into the first vehicle without contacting the pickup tailgate with a front of the forklift;
   determining that the first vehicle is ready to be moved;
   removing the pivot limiting pin and pivoting upward the bumper member until the bumper member is vertical; and
   moving the first vehicle.

\* \* \* \* \*